(12) United States Patent
Fröböse et al.

(10) Patent No.: US 11,339,631 B2
(45) Date of Patent: May 24, 2022

(54) DOWNHOLE TUBING OR UMBILICAL WITH SENSOR AND METHOD FOR MANUFACTURING IT

(71) Applicant: Sandvik Materials Technology Deutschland GmbH, Düsseldorf (DE)

(72) Inventors: Thomas Fröböse, Versmold (DE); Christofer Hedvall, Bielefeld (DE); Leandro Finzetto, Katy, TX (US)

(73) Assignee: Sandvik Materials Technology Deutschland GmbH, Düsseldorf (DE)

( * ) Notice: Subject to any disclaimer, the term of this patent is extended or adjusted under 35 U.S.C. 154(b) by 33 days.

(21) Appl. No.: 16/958,199

(22) PCT Filed: Dec. 28, 2018

(86) PCT No.: PCT/EP2018/097099
§ 371 (c)(1),
(2) Date: Jun. 26, 2020

(87) PCT Pub. No.: WO2019/129862
PCT Pub. Date: Jul. 4, 2019

(65) Prior Publication Data
US 2021/0071516 A1 Mar. 11, 2021

(30) Foreign Application Priority Data

Dec. 29, 2017 (DE) ...................... 10 2017 131 467.9
Dec. 29, 2017 (DE) ...................... 10 2017 131 468.7

(51) Int. Cl.
*E21B 43/013* (2006.01)
*E21B 47/017* (2012.01)
(Continued)

(52) U.S. Cl.
CPC .......... *E21B 43/013* (2013.01); *E21B 17/003* (2013.01); *E21B 47/00* (2013.01);
(Continued)

(58) Field of Classification Search
CPC ..................................................... E21B 43/013
See application file for complete search history.

(56) References Cited

U.S. PATENT DOCUMENTS 6,131,658 A * 10/2000 Minear ................... E21B 47/14
166/250.01
6,644,848 B1 * 11/2003 Clayton .................. E21B 17/01
374/7
(Continued)

FOREIGN PATENT DOCUMENTS

CA 2645630 A1 5/2009
GB 2348713 A 10/2000
(Continued)

OTHER PUBLICATIONS

International Search Report and Written Opinion issued in corresponding International Patent Application No. PCT/EP2018/097099, dated Mar. 28, 2019.

*Primary Examiner* — Frederick L Lagman
(74) *Attorney, Agent, or Firm* — Morgan, Lewis & Bockius LLP

(57) ABSTRACT

The present disclosure relates to a system having an inner structure, wherein the inner structure comprises at least one inner tube made of stainless steel and at least one sensor device with at least one sensor to measure at least one condition of the system. Under an aspect of the present disclosure a system of this type is suggested, wherein the inner structure is coated with at least one layer of at least one plastic material.

15 Claims, 5 Drawing Sheets

(51) Int. Cl.
| | |
|---|---|
| *E21B 17/00* | (2006.01) |
| *E21B 47/00* | (2012.01) |
| *E21B 47/12* | (2012.01) |
| *G01D 11/24* | (2006.01) |
| *B21C 37/20* | (2006.01) |
| *F16L 9/19* | (2006.01) |

(52) U.S. Cl.
CPC ............ *E21B 47/017* (2020.05); *E21B 47/12* (2013.01); *G01D 11/245* (2013.01); *B21C 37/202* (2013.01); *F16L 9/19* (2013.01)

(56) References Cited

U.S. PATENT DOCUMENTS

| | | | |
|---|---|---|---|
| 8,925,627 B2 * | 1/2015 | Tupper | E21B 43/2401 |
| | | | 166/77.2 |
| 10,711,591 B2 * | 7/2020 | Berzanskis | E21B 47/017 |
| 2005/0172721 A1 * | 8/2005 | Daigle | E21B 47/017 |
| | | | 73/705 |
| 2007/0251694 A1 | 11/2007 | Ju et al. | |
| 2009/0067776 A1 | 3/2009 | Ramos et al. | |
| 2014/0199775 A1 * | 7/2014 | Bagley | G01N 17/006 |
| | | | 436/163 |
| 2017/0152738 A1 * | 6/2017 | Berzanskis | E21B 17/206 |
| 2018/0156026 A1 * | 6/2018 | Kalia | E21B 17/006 |
| 2018/0347345 A1 * | 12/2018 | Dighe | E21B 17/003 |

FOREIGN PATENT DOCUMENTS

| | | | | |
|---|---|---|---|---|
| GB | 2458955 A * | 10/2009 | .......... | G01M 11/086 |
| WO | WO-2006050488 A1 * | 5/2006 | .......... | E21B 47/007 |
| WO | 2010/025159 A1 | 3/2010 | | |
| WO | 2017/102227 A1 | 6/2017 | | |

* cited by examiner

DOWNHOLE TUBING OR UMBILICAL WITH SENSOR AND METHOD FOR MANUFACTURING IT

TECHNICAL FIELD

The present disclosure relates to a system having an inner structure, wherein the inner structure comprises at least one inner tube made of stainless steel (seamless or longitudinal seam welded) and at least one sensor device comprising at least one sensor to measure at least one condition of the system.

Furthermore, the present disclosure relates to a method for manufacturing a system comprising the steps providing at least one inner tube of stainless steel, and providing at least one sensor device with at least one sensor to measure at least one condition of the system, wherein the at least one inner tube and the at least one sensor device form an inner structure of the system.

Tubes of metal (seamless or longitudinal seam welded) in particular of stainless steel, are used in a plurality of applications, in which the tubes are subject to multiple stresses. For example, in the high pressure technology and in the chemical industry, tubes are used, which are subject to high pressures and the tubes have to withstand these high pressures during long time. High pressures and other stresses may for example lead to the formation of cracks and/or in the worst case to pipe bursts, which not only require a replacement of the respective tube, but also will increase the costs.

There is therefore a need for a system comprising a tube and a sensor device as well as for a method for manufacturing such a system which will reduce or at least partially avoid the above constraints.

Further, in the oil and gas industry, tubes of stainless steel (seamless or longitudinal seam welded) inter alia are used to guide hydraulic fluids under high pressure between an offshore platform and the actual drill hole, i.e. from a topside to subsea. In some scenarios, the hydraulic fluid is distributed at a subsea satellite to a plurality of drill holes. At the place of the actual drill hole, the hydraulic fluid transported or guided by the tubes is used to open or close hydraulically actuated valves opening or closing the production line for the gas or oil to be produced. The stainless steel tubes for the hydraulic fluids are bundled or packed, wherein a plurality of tubes are integrated in a single cover or housing. The packed tubes are denoted as a control line or umbilical since the hydraulic fluid to be guided through the tubes serves to control the flow of oil or gas. Sometimes the packed tubes are denoted as a flat pack due to a larger extension of the pack in one dimension than in the other.

Still, there is a need for a control line, which not only serves to guide the hydraulic control fluid, but which can also fulfill further functionalities in the oil or gas production.

SUMMARY

Under an aspect of the present disclosure, a system is provided having an inner structure, wherein the inner structure comprises at least one inner tube made of stainless steel and at least one sensor device with at least one sensor to measure a condition of the system, wherein the inner structure is coated with at least one layer of at least one plastic material. The at least one layer of at least one plastic material provides a protective cover for the inner structure. Further, the at least one layer of at least one plastic material may be efficiently and cost effectively coated onto the inner structure.

According to the present disclosure, the at least one layer of the at least one plastic material covers the inner structure of the system, namely the at least one inner tube and the sensor device.

According to an embodiment of the present disclosure, the sensor device is confined between the at least one inner tube and the at least one layer of the at least one plastic material.

In an embodiment of the present disclosure, the at least one plastic material may be chosen from a polymer which is suitable for the application. For example, but not limited thereto, the plastic material is chosen from a group consisting of polyvinyl chloride polypropylene, PVDF, polyamide, Nylon, TPV, TPU, PEEK, ECTFE, ETFE, FEP, PFA, MFA, a non-fluorine based polymer, a fluorine based polymer and any combination thereof.

The at least one plastic material during the application of the at least one layer onto the inner structure is plastically deformable and will thus cover the entire inner structure circumferentially. Hence, even if in an embodiment, the sensor device projects from a cylindrical outer surface of the inner tube, the at least one layer according to an embodiment may still provide a fully cylindrical and smooth outer surface.

In an embodiment of the present disclosure, the inner structure comprises exactly one inner tube. A tube in the sense of the present disclosure is an elongated structure with a hollow core which is suitable for guiding a liquid or a gas. In an embodiment the at least one tube comprises a cylindrical wall.

Under a further aspect of the present disclosure, a system is provided wherein the system has an inner structure comprising at least two inner tubes made of stainless steel, and at least one spacer placed between each two neighbouring inner tubes, wherein the inner structure is coated with at least one layer of at least one plastic material, and wherein the inner structure further comprises at least one sensor device with the at least one sensor. In this embodiment, the at least one layer of the at least one plastic material covers the inner structure of the control line, namely the at least two inner tubes, the at least one spacer between each two neighboring tubes and the at least one sensor device.

In an embodiment of the present disclosure, the system is a control line for offshore applications, wherein the sensor is provided to measure at least one condition in the control line.

The at least one spacer placed between each two neighboring tubes defines a predetermined distance between each two neighboring tubes. In an embodiment of the present disclosure, at least one of the at least one spacer is manufactured of a plastic material or of a metal. The term metal as it is used here includes a metal as well as metal alloys.

In an embodiment, at least one of the at least one inner tube is chosen of a seamless tube or a longitudinal seam welded tube. However, in an embodiment, each of at least two inner tubes is a seamless tube. Under the conditions in offshore applications, seamless tubes may provide a better durability and a longer service life.

In an embodiment of the present disclosure the at least one inner tube of the system has a cylindrical outer surface, wherein the at least one sensor device is placed on the outer surface of the at least one inner tube to project from the cylindrical outer surface. This embodiment reduces the number of steps required for manufacturing of the system as no additional machining or generally processing of the outer surface is required.

In a further embodiment, at least one cavity extends in the at least one inner tube, wherein the at least one cavity has a radial extension from the outer surface of the inner tube into the inner tube. According to this embodiment, the at least one sensor device is placed in the at least one cavity. In this embodiment, the at least one sensor device is recessed into the outer surface of the inner tube such that the at least one layer of the at least one plastic material after coating of the inner structure has an even and smooth surface.

In a further embodiment, the at least one sensor is chosen of an acceleration sensor, a vibration sensor, a conductivity sensor, a pressure sensor, a temperature sensor, a strain gauge, a corrosion sensor, a magnetic field sensor, a heat flux sensor, a torque sensor or a combination thereof.

Out of this listing of possible sensors, a temperature sensor or a strain gauge have proven to be advantageous as they will allow the determination of the load of the tube structure during operation of the system.

Depending on the choice of the type of the at least one sensor, different conditions or parameters of the system are measured. A condition of the system in the sense of the present disclosure may alternatively denote a condition of the at least one inner tube, a condition of the inner structure, a condition of the inner structure or a condition of the at least one layer or a condition of a fluid flowing though the inner tube.

In an embodiment, the at least one condition of the system to be measured by the at least one sensor, the sensor is chosen so that any or more of the following parameters are measured: an acceleration, a vibration, a conductivity of the inner tube, a temperature of the inner tube, a pressure of a fluid transported through the inner tube, a heat flux in the inner tube or a combination thereof.

While the at least one sensor determines at least one condition in the system, this condition will allow to conclusions to be drawn respect to at least one condition of an environment of the system outside the at least one layer of the at least one plastic material. In an embodiment of the present disclosure, the at least one sensor of the at least one sensor device can thus be used for determining a condition of a downhole tubing including a control line as a system according to an embodiment of the present disclosure described hereinabove and hereinafter.

According to a further embodiment of the present disclosure, the at least one sensor device comprises one or more sensors, but no other elements providing additional functionalities. However, according to an alternative embodiment, the sensor device, in addition to the at least one sensor, comprises at least one additional element providing at least one additional functionality such as a rechargeable battery.

In an embodiment of the present disclosure, the at least one sensor device, in addition to the at least one sensor, comprises an inner wireless data coupling element 17, wherein the inner wireless data coupling element 17 is operatively connected to the at least one sensor to receive a signal containing measurement information from the at least one sensor, and wherein the inner wireless data coupling element 17 is arranged to transmit a signal containing the measurement information received from the at least one sensor to an environment outside the at least one layer of at least one plastic material. Providing the sensor device with the ability to communicate measurement information obtained from the at least one sensor to an environment outside the at least one layer of at least one plastic material may avoid the necessity to couple the at least one sensor device to an additional signal line. A wired coupling of the at least one sensor device will always require a feed through of the wire through an outer surface of the at least one layer of at least one plastic material, which feed through may weaken the protective properties of the at least one layer.

In another embodiment of the present disclosure, the inner structure comprises at least one signal line operatively coupled to the at least one sensor device to at least transmit a signal originating from the at least one sensor device.

In a further embodiment of the present disclosure, the at least one signal line is chosen of a line for an electrical signal such as an electric wire, a line for an electromagnetic signal such as an electromagnetic waveguide, a line for an optical signal such as an optical waveguide or a combination thereof.

In an embodiment of the present disclosure, the at least one signal line extends in a longitudinal direction of the at least one inner tube, i.e. essentially parallel to the extension of the inner tube. This way any signal transmitted on the at least one signal line propagates along the longitudinal direction of the inner tube.

In an embodiment of the present disclosure, at least one groove extends in an outer surface of at least one of the at least one inner tube. The at least one groove extends in a longitudinal direction of the inner tube. In an embodiment, the at least one groove extends over an entire longitudinal extension of the inner tube. The at least one signal line is placed in the at least one groove. Further, in this embodiment, the at least one sensor device is operatively coupled to the at least one sensor in order to at least transmit a signal from the sensor device over the signal line. The at least one groove forms a cavity to accommodate a signal line which will extend in a longitudinal direction of the inner tube. As explained above, with respect to the cavity accommodating the at least one sensor device at least one groove will enable application of the at least one layer of at least one plastic material on the inner structure while at the same time provide a regular cylindrical outer surface of the at least one layer. Thus, the thickness of the at least one layer of at least one plastic material may be reduced as the at least one sensor device may be countersunk in the groove.

Furthermore, in an embodiment, the at least one sensor device may also be placed in the at least one groove.

In an embodiment of the present disclosure, the inner structure of the system comprises at least one further component. In an embodiment, the further component is at least one of a fiber optical cable, a fluid injection line, an electrical signal line, an optical signal line, a mechanical component for crush resistance and additional longitudinal strength or a combination thereof.

Under a further aspect of the present disclosure, a downhole tubing is provided, wherein the downhole tubing comprises an outer tube, at least one system as it is described hereinbefore or hereinafter forming a control line in the downhole tubing and at least one production line, wherein the at least one control line and the at least one production line are placed in the outer tube.

In order to transfer or guide the oil or gas subsea, e.g. from the downhole to a topside, the downhole tubing comprises an outer tube covering and protecting all tubes and elements needed for oil or gas production. The tubes and elements needed for oil or gas production are placed in the outer tube. At least one control line according to the present disclosure as described hereinbefore and hereinafter is needed in the outer tube to actuate valves opening or closing the fluid production.

Under a further aspect of the present disclosure, an umbilical is provided, wherein the umbilical comprises an outer tube, at least one system as it is described hereinbefore or hereinafter forming a control line and at least one further support line, wherein the at least one control line and the at least one support line are placed in the outer tube.

In an embodiment, the umbilical is a subsea umbilical. A subsea umbilical is a bundle of cables and conduits that transfer resources, like power, liquid or gaseous operating resources and signals, subsea within the oil or gas field or from a topside to subsea.

A support line in the sense of the present disclosure is any line which is suitable to transfer an operational resource medium to or from a subsea equipment like a subsea tree, a manifold, a jumper, a sleds or a control.

In an embodiment, the at least one support line is selected from a chemical injection tube, a telecommunications cable (wire), an optical fibre and an electrical cable.

In order to transfer operating resources, the umbilical comprises an outer tube covering and protecting all tubes and elements needed. The tubes and elements needed are placed in the outer tube.

In an embodiment of the present disclosure, the at least one inner tube in the at least one control line of the downhole tubing or of the umbilical is a hydraulic line to provide hydraulic power to subsea or to distribute hydraulic power subsea.

In an embodiment, the outer tube is a tube of at least one plastic material.

The inner tubes in the control line of the downhole tube or of the umbilical are well protected by the at least one layer of at least one plastic material surrounding the inner structure of the control line. Additionally, the present disclosure uses this protection to protect the at least one sensor device with the at least one sensor. The at least one sensor device may not only determine at least one condition of the inner structure of the control line itself, it may also determine at least one condition or parameter of the environment of the control line. As the control line is located in the outer tube of the downhole tubing or of the umbilical, the at least one sensor device may be used to determine at least one condition or parameter in the downhole tubing or umbilical. Conditions in the downhole tubing or in the umbilical may in particular be pressure and temperature.

Under another aspect of the present disclosure, a method for manufacturing a system is provided, wherein the method comprises the steps of providing at least one inner tube of stainless steel; providing at least one sensor device with at least one sensor to measure a condition of the system; wherein the at least one inner tube and the at least one sensor device form an inner structure of the system, and coating the inner structure with at least one layer of at least one plastic material.

In an embodiment of the present disclosure, the method further comprises the steps providing at least two inner tubes of stainless steel; providing at least one spacer; and placing the at least one spacer between each two neighbouring inner tubes.

In yet a further embodiment of the method according to the present disclosure, the system is a control line for offshore applications and wherein the at least one sensor is provided to measure at least one condition in the control line.

In an embodiment of the present disclosure, the step of coating the inner structure comprises that the at least one layer is extruded around the inner structure. By extruding the at least one layer around the inner structure, a tight fitting of the at least one layer of at least one plastic material around the inner structure may be achieved.

In an embodiment of the present disclosure, the step of providing the at least one inner tube comprises cold working of a at least one hollow into at least one of the at least one inner tube. Cold working in the sense of the present disclosure includes cold drawing and cold pilger milling. Cold working in the sense of the present disclosure is a forming or working carried out at a temperature below the recrystallization temperature of the stainless steel.

In a further embodiment, the step of providing the at least one inner tube comprises that the hollow is cold drawn into the inner tube through a drawing matrix with at least one protrusion to form at least one groove in the outer surface of the inner tube, wherein the at least one sensor device is placed in the at least one groove.

BRIEF DESCRIPTION OF THE FIGURES

The foregoing as well as the following detailed description of embodiments will be better understood when read in conjunction with the appended drawings. It should be understood that the embodiments depicted are not limited to the precise arrangements and instrumentalities shown.

DETAILED DESCRIPTION

Figure 1:
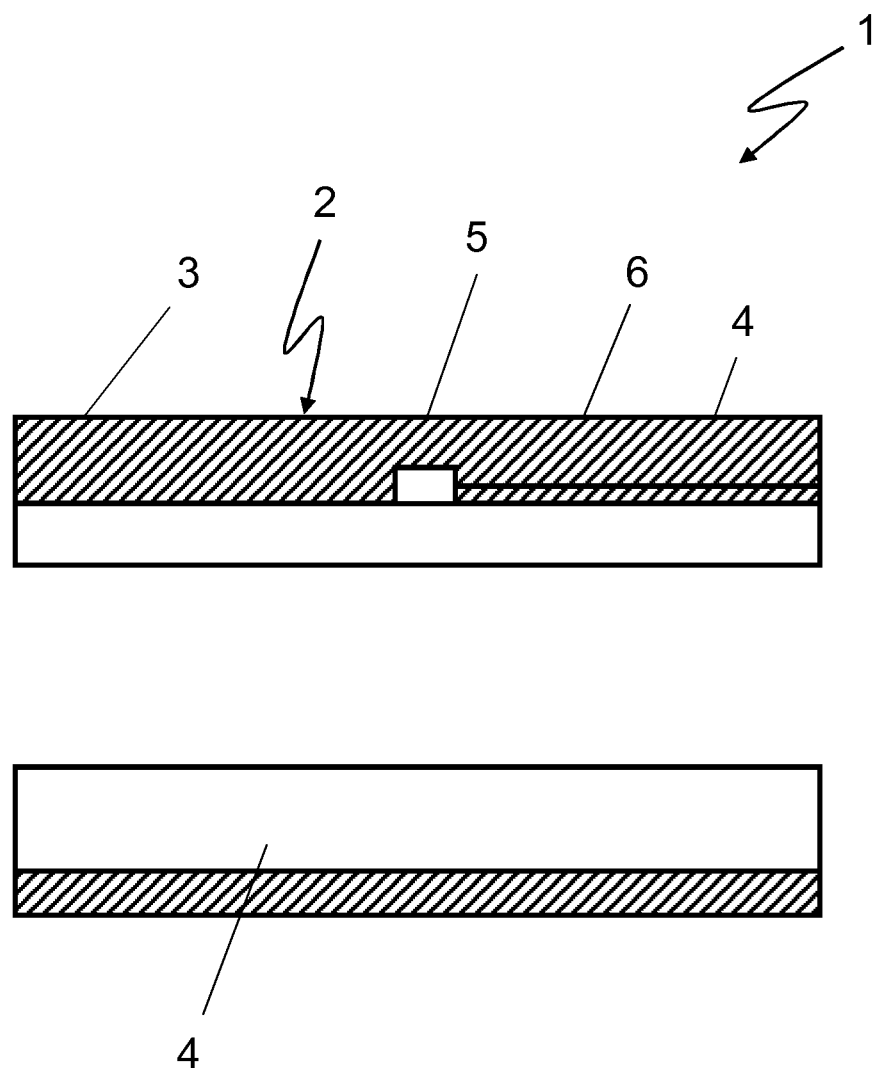
FIG. 1 is a schematic longitudinal cross-sectional view of an embodiment of a system according to the present disclosure.

In the figures like elements have been denoted by like reference numbers.

The system 1 explained hereinafter with reference to the two cross-sectional views of FIGS. 1 and 2 has an inner structure 2 and a layer 3 of a plastic material. The inner structure 2 in turn consists of an inner stainless steel tube 4, a sensor device 5 as well as a signal line 6.

Figure 2:
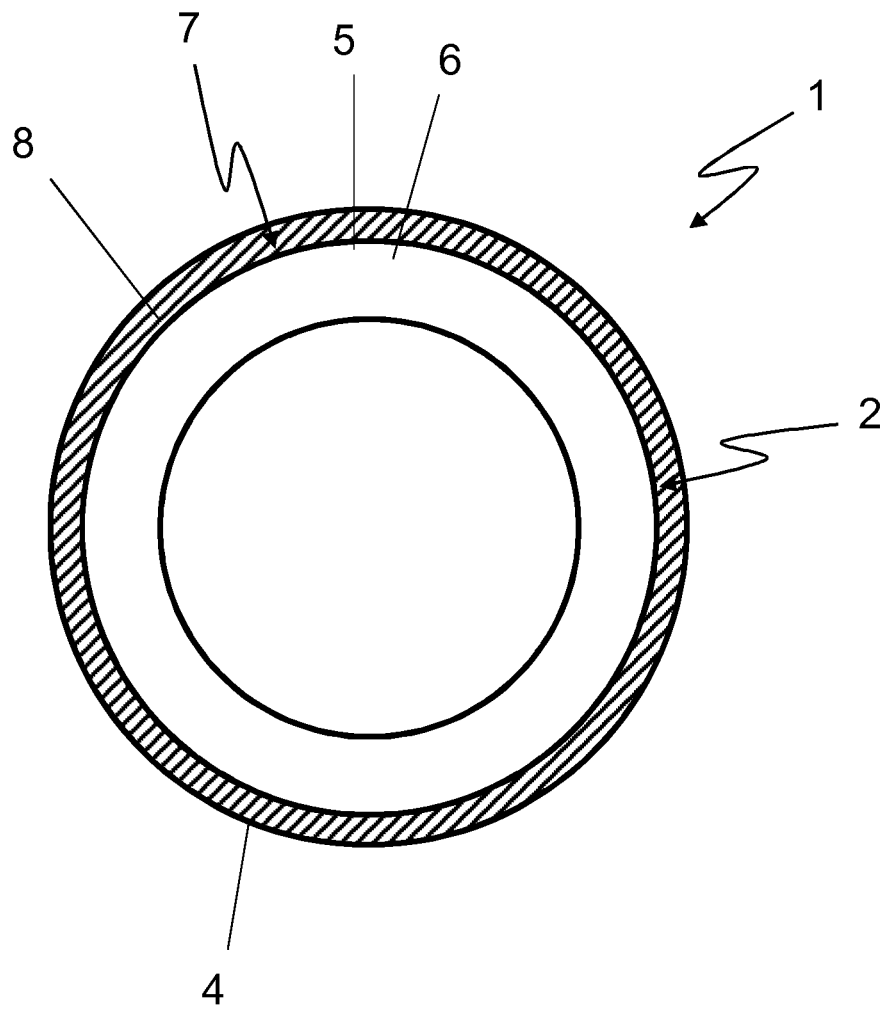
FIG. 2 is a schematic cross-sectional view of the system of FIG. 1 in a plane perpendicular to the cross-sectional view of FIG. 1.

The inner stainless steel tube 4 comprises a groove 7, which is particularly visible in the cross-sectional view of FIG. 2 perpendicular to the longitudinal extension of the inner stainless steel tube 4. The groove 7 extends from an outer surface 8 of the inner stainless steel tube 4 in a radial direction into the material of the inner stainless steel tube 4.

The depth of the groove 7 in the radial direction of the inner stainless steel tube 4 is such that the sensor device 5 and the signal line 6 can be placed in the groove 7 such that the sensor device 5 in the radial direction does not extend beyond the outer surface 8 of the inner stainless steel tube 4. The groove 7 in the inner stainless steel tube 4 extends along the entire longitudinal extension of the inner stainless steel tube 4 such that the signal line 6 runs along the longitudinal direction of the inner stainless steel tube 4.

In the system 1 of FIGS. 1 and 2, the sensor device 5 comprises a pressure sensor, only. The pressure sensor is in contact with the surface of the inner tube to detect a pressure of a fluid flowing through the inner stainless steel tube 4 as a condition of the system 1.

The sensor device 5 is operatively connected to the signal line 6 in order to be able to transmit a signal containing measurement information gathered by the pressure sensor via the signal line 6 to a data processing equipment at an end of the inner stainless steel tube 4.

In order to fix the sensor device 5 as well as the signal line 6 in the groove 7 the inner structure 2 is coated by the layer of plastic material 3, wherein in the system depicted in FIGS. 1 and 2, the layer of plastic material 3 is polyvinyl chloride.

In order to manufacture the system 1 of FIGS. 1 and 2, a seamless hollow of a stainless steel material was cold drawn through a drawing matrix having a protrusion at the circumferential position of the groove 7. By the drawing process, the dimensions of the inner stainless steel tube 4 were finalized and the groove 7 was drawn into the outer surface 8 of the inner tube 4. Consequently, the groove 7 extends over the entire lengths of the inner stainless steel tube 4.

After placing the sensor device 5 and the signal line 6 in the groove 7, the layer 3 of polyvinyl chloride was extruded around the inner structure 2.

Figure 3:
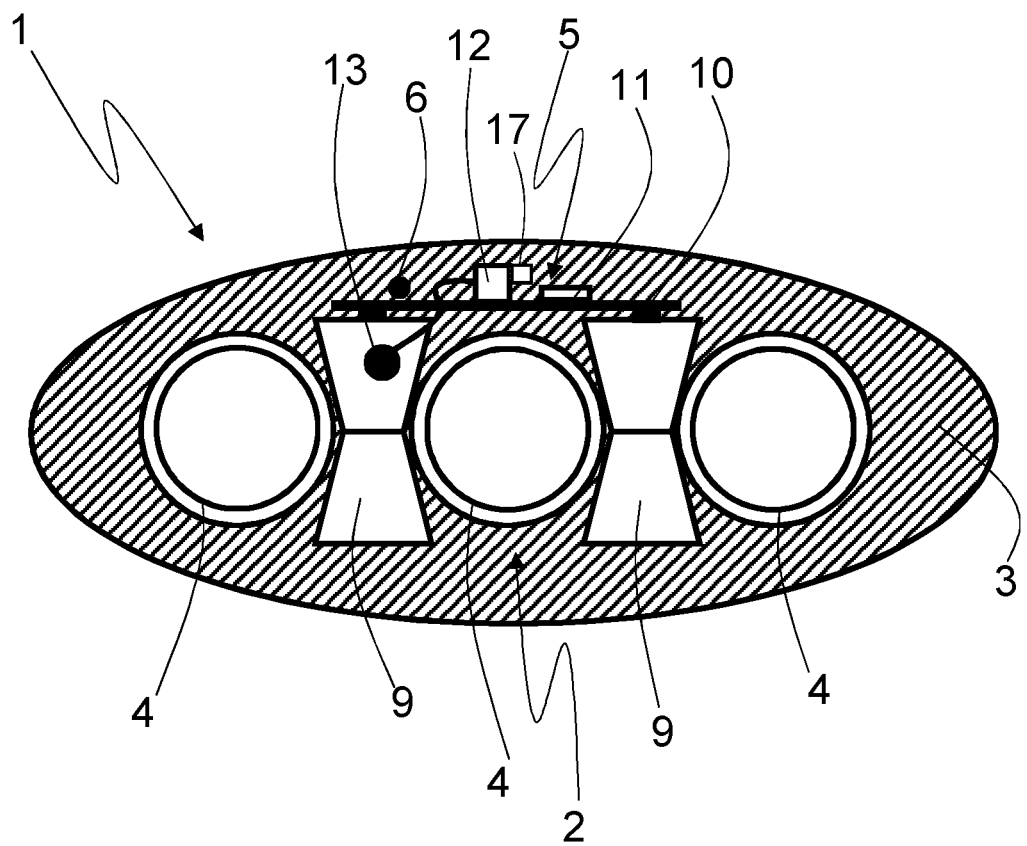
FIG. 3 is a schematic cross-sectional view of a control line for offshore applications according to an embodiment of the present disclosure.

FIG. 3 is a schematic cross-sectional view of a control line 1 for offshore applications. The control line 1 is an example of a system in the sense of the present disclosure. The control line 1 has an inner structure 2 with three inner stainless steel tubes 4 each made of stainless steel. The inner stainless steel tubes 4 are dimensioned such that they can guide hydraulic liquid to actuate a valve in a downhole tubing. Between each pair of inner stainless steel tubes 4, a spacer 9 is located. The spacers 9 define a constant distance between each pair of inner stainless steel tubes 4. In the control line 1 shown in FIG. 3, the spacers 9 are also made of a stainless steel. In the implementation of FIG. 3 the spacers 9 are made of a hollow stainless steel profile.

The inner structure 2 of the control line 1 additionally includes a sensor device 5, which will be described in further detail below.

All elements of the inner structure 2, i.e. the three inner stainless steel tubes 4, the spacers 9 as well as the sensor device 5 are covered by a coating of at least one layer 3 of a plastic material, for example PVC. While the control line 1 of FIG. 3 is shown to have a single layer 3 of plastic material, only, there are alternative designs for the control line, wherein the inner structure 2 is coated with a plurality of layers including a plurality of layers 3 of a plurality of plastic materials.

In the control line 1 of FIG. 3, the sensor device 5 consists of a circuit board 10 which is mounted on the spacers 9 such that it bridges the inner stainless steel tubes 4 in the middle of the control line 1. On the top surface of the circuit board 10, is a pressure sensor 11 placed. The pressure sensor 11 is connected by a conductive wiring to a data processing element 12, which can store and forward any measurement information detected and signaled by the pressure sensor 11. In addition to the pressure sensor 11, the sensor device 5 has a thermocouple 13. In contrast to the pressure sensor 11, the thermocouple 13 is not mounted on the circuit board 10 but is attached to the spacer 9 and effectively coupled to the data processing element 12 by a conductive wiring.

In the control line 1 of FIG. 3, the two sensors 11, 13 are used to measure two conditions in the control line 1, namely pressure and temperature. However, the pressure sensor 11 is arranged and placed such that the pressure detected corresponds to a pressure applied to the outside of the layer 3 of plastic material, i.e. a pressure in the environment surrounding the control line 1, and a temperature in the outside environment of the control line 1. Further, assuming that the control line 1 has a considerable thermal conductivity, the temperature detected by the thermocouple 13 allows to derive the temperature of the outer environment of the control line 1.

The data processing element 12 in turn is electrically coupled to a signal line 6 extending in the longitudinal direction of the control line 1, i.e. into a direction perpendicular to the plane of paper of FIG. 3.

Figure 4:
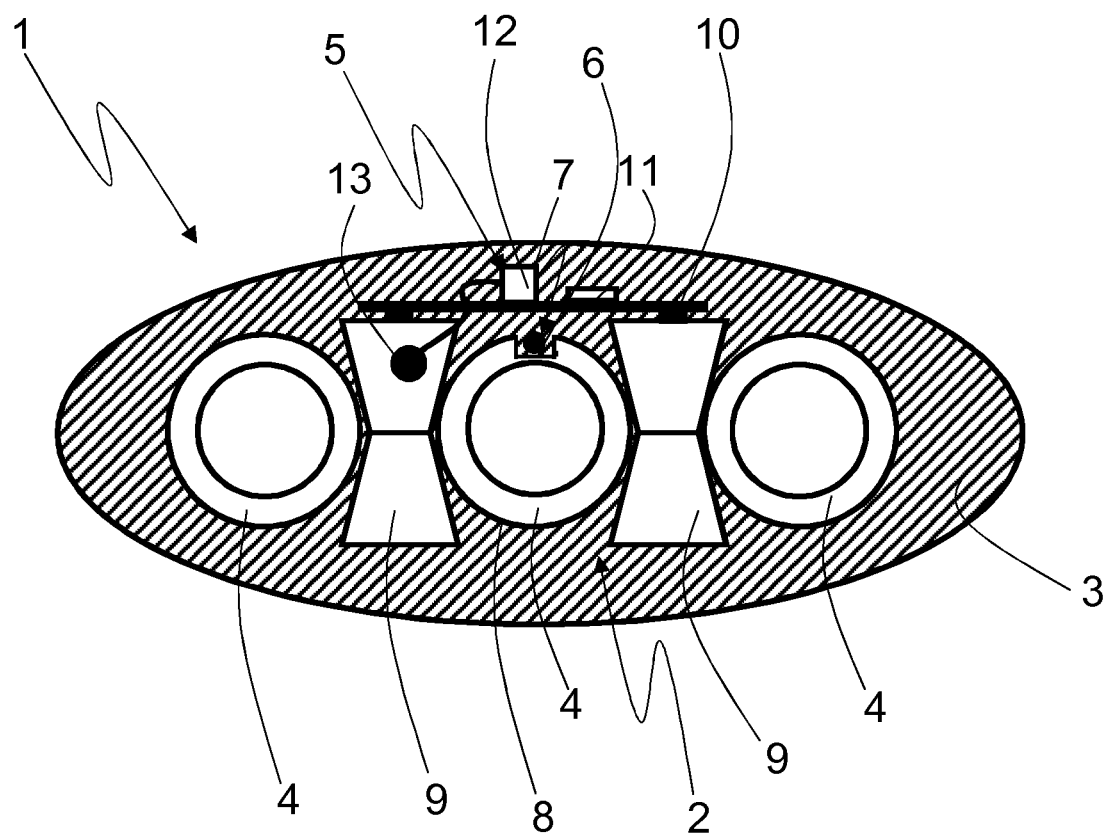
FIG. 4 is a schematic cross-sectional view of a control line for offshore applications according to a further embodiment of the present disclosure.

FIG. 4 is a schematic cross-sectional view of an alternative embodiment, wherein the difference between the control line 1 of FIG. 3 and the control line 1 of FIG. 4 is the design of the center inner stainless steel tube 4. The inner stainless steel tube 4 comprises a groove 7 in its outer surface 8. The groove has a radial extension from the outer surface 8 of the inner stainless steel tube in a radial direction into the material of the inner stainless steel tube 4, wherein the depth of the groove 7 is such that a signal line 6 can be placed in the groove such that it is fully recessed in the outer surface 8. Further, the groove extends in the longitudinal direction of the inner stainless steel tube 4 providing a longitudinal guidance for the signal line 6.

The groove 7 is manufactured during a cold drawing process of the inner stainless steel tube 4, wherein in order to provide the final dimensions of the inner stainless steel tube 4, a hollow had been drawn through a drawing matrix. For the inner stainless steel tube 4, the drawing matrix had a protrusion shaping the groove 7 into the outer surface 8 of the inner stainless steel tube 4.

Figure 5:
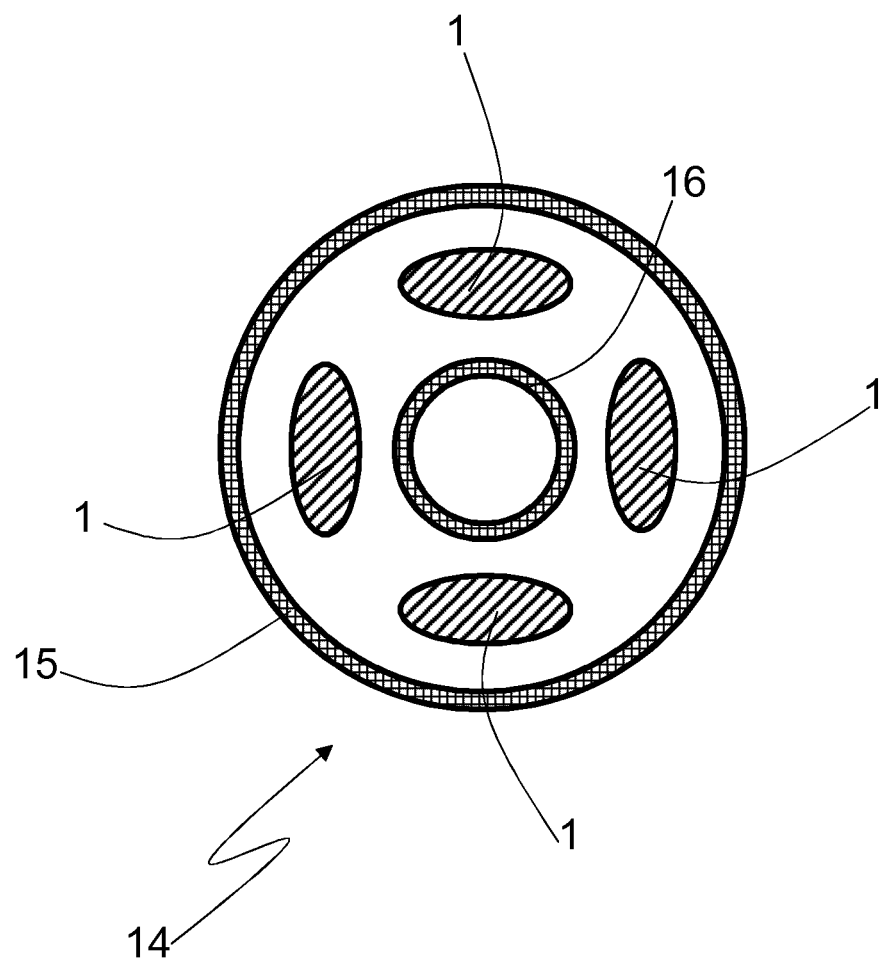
FIG. 5 is a schematic cross-sectional view of a downhole tubing according to an embodiment of the present disclosure comprising four control lines of FIG. 3.

FIG. 5 is a cross-sectional view of a downhole tubing 14 having four control lines 1 of FIG. 3 and a production line 16. Alternatively, the structure 14 of FIG. 5 could be an umbilical, wherein the tubular structure 16 is a chemical supply line to inject chemicals to a subsea equipment. The downhole tubing 14 further has an outer protective tube 15 covering and protecting all elements mounted therein. During operation of the downhole tubing 14, the production line 16 guides oil from the actual drill hole to an offshore platform or to a satellite connected to the offshore platform.

The cross-sectional view of FIG. 5 explains well that the control lines 1 whose primary function is to transport hydraulic liquid to valves opening and closing the production line 16 along the downhole tubing 14 due to their positioning around the production line 16 are well suitable to house the sensor device 5 in order to determine pressure and temperature in the outer tube 15 of the downhole tubing 14.

Further advantages, features and applications of the present disclosure will become apparent from the following description of embodiments and the corresponding figures attached. The foregoing as well as the following detailed description of embodiments will be better understood when read in conjunction with the appended drawings. It should be understood that the embodiments depicted are not limited to the precise arrangement and instrumentalities shown.

For purposes of the original disclosure, it is noted that all features become apparent for a person skilled in the art from the present description, the figures and the claims even if they have only been described with reference to particular further features and can be combined either on their own or in arbitrary combinations with other features or groups of features disclosed herein as far as such combinations are not explicitly excluded or technical facts exclude such combinations or make them useless. An extensive, explicit description of each possible combination of features has only been omitted in order to provide a short and readable description. While the disclosure has been shown in detail in the figures and the above description, this description is only an example and is not considered to restrict the scope of protection as it is defined by the claims. The disclosure is not restricted to the disclosed embodiments.

Modifications to the disclosed embodiments are apparent for a person skilled in the art from the drawings, the description and the attached claims. In the claims, the word "comprising" does not exclude other elements or steps and the undefined article "a" does not exclude a plurality. The mere fact that some features have been claimed in different claims does not exclude their combination. Reference numbers in the claims are not considered to restrict the scope of protection.

LIST OF REFERENCE SIGNS

1 System/control line
2 Inner structure
3 Layer of plastic material
4 Inner stainless steel tube
5 Sensor device
6 Signal line
7 Groove
8 Outer surface of the inner tube 4
9 Spacer
10 Circuit board
11 Pressure sensor
12 Data processing element
13 Thermocouple
14 Downhole tubing or umbilical
15 Outer protective tube
16 Production line

The invention claimed is:

1. An umbilical comprising:
an outer tube;
at least one system including an inner structure coated with at least one layer of at least one plastic material; and
at least one support line,
wherein the at least one system and the at least one support line are placed in the outer tube,
wherein the inner structure includes at least one inner tube made of stainless steel and at least one sensor device with at least one sensor to measure at least one condition of the system,
wherein the at least one sensor device comprises a wireless data coupling element, the wireless data coupling element is operatively connected to the at least one sensor to receive a signal from the at least one sensor, and the wireless data coupling element is arranged to transmit the signal received from the at least one sensor,
wherein at least one groove extends in an outer surface of at least one of the at least one inner tube in a longitudinal direction of the at least one inner tube,
wherein at least one signal line which is operatively coupled to the at least one sensor device is placed in the at least one groove,
wherein the system is a control line for offshore applications, and
wherein the at least one sensor is provided to measure at least one condition in the control line.

2. The umbilical according to claim 1, wherein the inner structure comprises:
at least two inner tubes made of stainless steel, and
at least one spacer placed between each of the two neighbouring inner tubes.

3. The umbilical according to claim 1, wherein at least one of the at least one inner tube is a seamless tube or a longitudinal seam welded tube.

4. The umbilical according to claim 1, wherein at least one cavity extends in at least one of the at least one inner tube,
wherein the at least one cavity has a radial extension from an outer surface of the at least one inner tube, and
wherein the at least one sensor device is placed in the at least one cavity.

5. The umbilical according to claim 1, wherein the at least one sensor is chosen from an acceleration sensor, a vibration sensor, a conductivity sensor, a pressure sensor, a temperature sensor, a strain gauge, a corrosion sensor, a magnetic field sensor, a heat flux sensor, a torque sensor or a combination thereof.

6. The umbilical according to claim 1, wherein the inner structure comprises at least one signal line operatively coupled to the at least one sensor device to at least transmit a signal from the at least one sensor device, and
wherein the at least one signal line extends in a longitudinal direction of the system.

7. The umbilical according to claim 6, wherein the at least one signal line is chosen from a line for an electrical signal, a line for an electromagnetic signal, a line for an optical signal or a combination thereof.

8. The umbilical according to claim 1, wherein the at least one support line is selected from a chemical injection tube, a telecommunications cable, an optical fibre and an electrical cable.

9. The umbilical according to claim 1, wherein the control line actuates valves for fluid production.

10. The umbilical according to claim 1, wherein the control line is a hydraulic line to provide hydraulic power to subsea or to distribute hydraulic power subsea.

11. A method for manufacturing the umbilical according to claim 1, the method comprising the steps of:
forming the inner structure of the system including the at least one inner tube of stainless steel and the at least one sensor device with the at least one sensor to measure at least one condition of the system; and
coating the inner structure with the at least one layer of the at least one plastic material.

12. The method according to claim 11, further comprising the steps of:
providing at least two inner tubes of stainless steel;
providing at least one spacer; and
placing the at least one spacer between each two neighbouring inner tubes.

13. The method according to claim 11, wherein the step of coating comprises extruding at least one layer around the inner structure.

14. The method according to claim 11, wherein the step of providing the at least one inner tube comprises cold working at least one hollow into at least one of the at least one inner tube.

15. The method according to claim 14, wherein the step of providing the at least one inner tube comprises cold drawing the at least one hollow into the at least one inner tube through a drawing matrix with at least one protrusion to form at least one groove in the outer surface of the at least one inner tube, and wherein the at least one sensor device is placed in the at least one groove.

* * * * *